UNITED STATES PATENT OFFICE 2,582,897

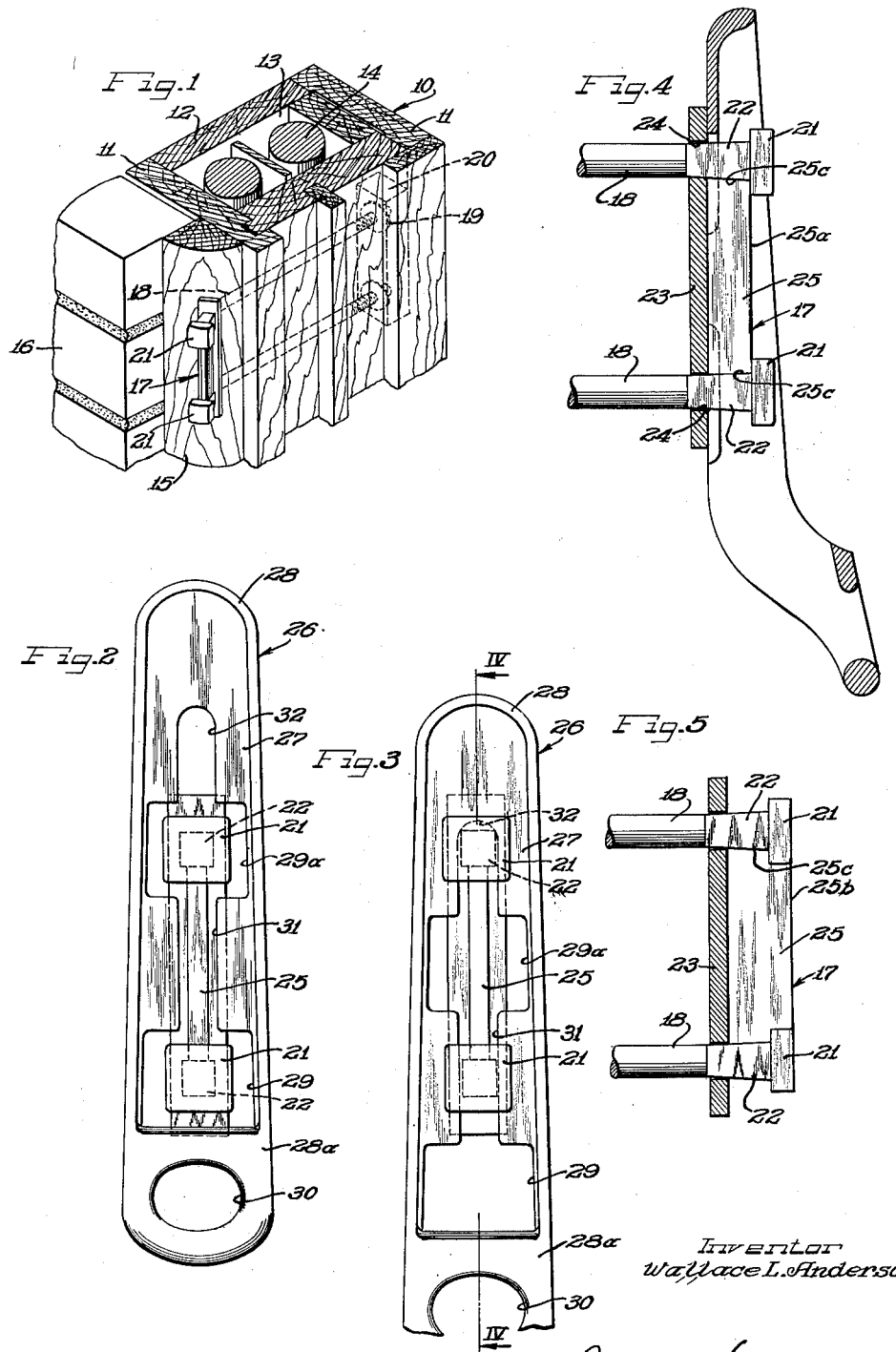

SAFETY ANCHOR SPACER PLATE OR BAR

Wallace L. Anderson, Chicago, Ill., assignor to Harrison-Weise Company, Chicago, Ill., a corporation of Illinois Application January 6, 1949, Serial No. 69,455

1 Claim. (Cl. 20—72)

This invention relates to a safety anchor spacer plate or bar and more particularly to a spacer plate or bar for a window washer safety anchor of the type generally attached to windows of a building or the like.

In the architectural arts, particularly with the development of relatively high, multi-story buildings, it has become conventional practice to provide window washer safety anchors adjacent each vertical edge of each window to which the safety strap of a window washer may be attached while the window is being cleaned. Such safety anchors provide one or more bolts which extend beyond the window frame for engagement by a self-locking safety strap terminal to support the window washer while he is cleaning the window. The use of separate, spaced bolts as heretofore proposed, the bolts being sometimes joined by a straight spacer bar or plate, has proved generally satisfactory. However, the window washer oftentimes becomes careless and affixes his safety strap terminal ends to only one of the bolts rather than to the pair which are provided. When attached to one bolt a safety strap terminal end may slip permitting the washer to fall with disastrous consequences. A number of States now require that window washer safety anchors be provided with means for preventing the slipping of a terminal end over only one of a pair of spaced safety anchor bolts in an attempt to obviate the possibility of accidents arising from this cause.

The present invention now provides an improved type of window washer safety anchor spacer plate or bar which completely eliminates the possibility of the terminal end of the safety strap engaging merely one of the bolts, thus increasing the safety of the operation of the anchor. Further, the improved spacer plate or bar of the present invention effectively serves to reinforce the exposed ends of the safety anchor bolts. Also, in placing the safety anchor bolts into position for use and adjusting the length of exposed bolt ends for engagement by the terminal of the safety strap, it has been extremely difficult to accurately maintain a constant exposed portion of the anchor. The spacer bar of the present invention serves to limit the extent to which the safety anchor bolts may be drawn within the confines of the window, thus leaving exposed a proper length of the safety anchor bolts to insure adequate protection.

In general, a safety anchor spacer plate or bar of the present invention comprises an elongated plate having a pair of apertures formed adjacent each extremity for receiving a shank of the safety anchor bolts. The apertured plate is provided with an upstanding rib extending approximately normal to the plate between the bolt apertures. The upstanding rib is so dimensioned as to contact each of the safety anchor bolts passing through the plate, the plate extending between the bolts upon assembly of the safety anchor to provide reinforcing means resisting movement of the bolts toward each other.

Preferably the rib extends from the plate a sufficient distance to engage that surface of the bolt head which spaces the plate. The rib of the present invention is of relatively narrow cross-section compared with the bolt head and the spacer plate itself so as not to interfere with the locking of the safety belt terminal when placed in engagement with a bolt head.

It is, therefore, an important object of the present invention to provide an improved safety anchor spacer plate or bar for employment with window washer safety anchors, the plate being provided with a rib adapted to reinforce the safety anchor during use.

It is a further important object of the present invention to provide a safety anchor spacer plate or bar for use with safety anchor bolts, the spacer plate being provided with a rib extending normally thereto to lie between the bolts to reinforce the same, leaving the bolt heads exposed.

A further important object of the present invention is to provide a window washer safety anchor including a pair of safety anchor bolts having enlarged heads extending beyond the extremities of the window frame to which it is attached, a spacer plate adapted to receive the bolts extending therethrough and a rib secured to the plate and extending normally thereto to lie between the bolt heads to reinforce the safety anchor bolts, to space the safety anchor bolts from the window, and to prevent the engagement of only one of the bolts by the terminal of a conventional safety strap.

Other and further important objects of this invention will be apparent from the disclosures in the specification and the accompanying drawings.

On the drawings:

Figure 1 is a perspective, cross-sectional view of a window frame illustrating a safety anchor plate of the present invention installed therein;

Figure 2 is a plan view of a safety anchor spacer plate of the present invention, showing a safety strap terminal positioned thereabove;

Figure 3 is a view similar to Figure 2 showing the safety belt terminal engaging the safety bolts;

Figure 4 is a cross-sectional view taken along the plane IV—IV of Figure 3; and

Figure 5 is a cross-sectional view similar to Figure 4 showing a modified form of a safety anchor spacer plate of the present invention.

As shown on the drawings:

In Figure 1, reference numeral 10 refers generally to a window frame for a double sash window including spaced parallel stiles 11 and a pair of spaced mullions 12 defining an inner sash weight compartment 13 receiving sash weights 14. A molding strip 15 is provided to bridge the space between frame 10 and the wall 16 in which the frame 10 is disposed.

Reference numeral 17 refers generally to a window washer safety anchor including a pair of elongated bolts 18 passing through the outer mullion 12 carrying washers 19 bearing against a supporting block 20 abutting the interior stile 11. The washers 19 are urged against blocks 20 by suitable means, as by conventional nuts (not shown).

The heads 21 of bolts 18 are preferably rectangular or square in configuration and shank portions 22 joining the heads 21 to the bolts 18 are also preferably of rectangular cross-section. Of course, it is understood that bolts 18, the shanks 22 and the heads 21 are formed integrally from suitable material, such as naval brass. As shown in Figure 1, the shanks 22 may be deflected to lie at an angle to the axis of the bolts 18, so that a straight pull is exerted upon the bolt heads 21 despite the provision of the molding 15. Alternatively, in case the molding 15 is eliminated, the bolts 18 and the heads 21 may be formed in exact axial alignment.

The safety anchor spacer bar of the present invention comprises a generally rectangular plate 23 having spaced rectangular apertures 24 formed therein, one aperture being adjacent to each extremity of the plate 23. The apertures 24 are preferably rectangular in cross-section so as to conform to the outline of the shanks 22. A rib 25 is provided to extend generally normally to plate 23 between the apertures 24, the rib 25 being either formed integrally with plate 23, or being secured thereto by suitable means, as by soldering.

Each side extremity of the rib 25 is formed to conform to the outline of the shanks 22 of the bolts 18. As shown in Figure 4, the shanks 24 may be slightly tapered and the rib extremities 25c are correspondingly tapered to insure a tight fit with the shanks. The freely extending edge 25a of rib 25, spaced from the plate 23, is preferably so dimensioned so as to directly underlie bolt heads 21 to form a reinforcement for the bolt heads and to prevent deformation of the bolt heads from alignment with the mold 18.

In the modification shown in Figure 5 of the drawings, the rib 25 is substantially identical to that hereinbefore described with the exception that the freely extending extremity 25b of the rib 25 has been extended into alignment with the exposed outer surface of bolt heads 21. Thus, the rib 25 acts as a fillet extending between the bolt heads 21 and lying flush therewith to further reinforce the bolt heads 21.

In Figures 2 and 3, the safety anchor spacer plate or bar of the present invention is illustrated as employed with a conventional safety strap terminal, such as is well known in the art. The terminal 26 comprises generally a naval brass forging including a plate 27 having an upturned marginal flange 28 formed integrally therewith and extending beyond one edge thereof, as at 28a. The plate 27 is formed with relatively large spaced openings 29 and 29a adapted to be placed over the bolt heads 21. The aperture 29 has one open edge flush with one end of the plate 27 and the flange extension 28a overlying this open end is raised and apertured as at 30 to receive one end of a safety strap. The apertures 29 and 29a are connected by a relatively narrow slot 31 formed in plate 27 and a second slot 32 extends from the aperture 29a remote from aperture 30.

As best shown in Figure 2 of the drawings, the terminal 26 is placed over the bolt heads 21 with the bolt heads extending through the apertures 29 and the rib 25 projecting upwardly through the slot 31 connecting the apertures 29. As shown in Figure 3, following the positioning of the terminal 26 in position to overlie the bolt heads 21, the terminal is moved relatively to the bolt heads 21 and plate 23 so that the slots 32 and 31 underlie the bolt heads 21, the rectangular shank 22 of one of the bolts 18 engaging the end of slot 32.

The weight of the person employing the safety anchor illustrated in the drawings will be transmitted through terminal 26 to the bolts 18 and the weight of the user will force the terminal into closer engagement with the bolts. It will be noted from the foregoing description that the web or rib 25 does not interfere with the employment of the anchor with conventional terminals. Further, in normal use, weight is primarily placed upon the lower of the bolts 18 with this weight tending to deflect the head 21. Rib 25, by strengthening head 21, thus enables the safety anchor to take up this weight without deformation. However, upon the loss of footing by the user, weight is suddenly placed upon the upper bolt head 21 and rib 25 will serve to distribute this weight upon both of the bolts 18 and both heads 21, rather than merely upon the upper bolt. In this manner rib 25 serves effectively to increase the load bearing capacity of each of the bolts 18 by utilizing both bolts rather than the one upon which weight is primarily placed. Further, it will readily be seen that upon insertion of the bolt 18 in a position as illustrated in Figure 1 and upon tightening of the bolt nuts, the bolts may be drawn into the window frame only to the extent that rib 25 abuts the under surface of each of the bolt heads 21. Thus, the rib 25 automatically limits the extent of retraction of the bolts into the frame and obviates the dangers inherent in the exposure of an insufficient length of bolt shanks beyond the window frame 10.

Further, it is impossible for the user to engage only one of the bolt heads 21 with the terminal 26 inasmuch as the grip obtained upon such engagement would be insufficient to maintain a terminal 26 in position due to the weight of the terminal. The additional safety feature in the present invention residing in the impossibility of engaging one bolt head 21, in the distribution of weight between the two bolt heads 21 and bolts 18, and in the impossibility of withdrawing the bolts to an extreme degree within the confines of the window, combines to make the safety anchor of the present invention a distinct forward step in the art.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a window washer safety anchor having a pair of elongated bolts for retention within a window frame with the heads and portions of the shanks of said bolts extending therebeyond for engagement by a safety strap terminal, a separate flat spacer plate having apertures receiving and in tightly fitting relationship with the extended bolt shank portions at points spaced from the bolt heads and a rib integral with and normal to said plate and having end portions in conforming contact with said shank portions and said bolt heads to reinforce the same and to prevent the engagement of only one of said bolts by said terminal.

WALLACE L. ANDERSON.

REFERENCES CITED

The following references are of record in the file of this patent:

UNITED STATES PATENTS

| Number | Name | Date |
|---|---|---|
| 1,260,429 | Minnis | Mar. 26, 1918 |
| 1,274,404 | Finlayson | Aug. 6, 1918 |
| 1,319,889 | Minnis | Oct. 28, 1919 |
| 1,449,516 | Kugler | Mar. 27, 1923 |
| 1,816,433 | Hutchings | July 28, 1931 |
| 2,072,041 | Minnis, Jr. | Feb. 23, 1937 |
| 2,086,768 | Harrison | July 13, 1937 |